United States Patent
He

[11] Patent Number: 5,937,043
[45] Date of Patent: Aug. 10, 1999

[54] MECHANISM FOR A SYSTEM AND METHOD FOR DETECTING FRAUDULENT USE OF COLLECT CALLS

[75] Inventor: Jingsha He, Plano, Tex.

[73] Assignee: MCIWORLDCOM, Inc., Ga.

[21] Appl. No.: 08/758,024

[22] Filed: Nov. 27, 1996

[51] Int. Cl.⁶ .................... H04M 15/00; H04M 17/00; H04M 3/00
[52] U.S. Cl. .................... 379/114; 379/189; 379/145; 379/112; 445/410
[58] Field of Search ............................ 379/114, 189, 379/112, 115, 121, 188, 196, 197, 111, 113, 127, 118, 142, 145; 455/410, 406, 411

[56] References Cited

U.S. PATENT DOCUMENTS

| | | | |
|---|---|---|---|
| 4,756,020 | 7/1988 | Fodale | 379/112 |
| 4,935,956 | 6/1990 | Hellwarth et al. | 379/112 |
| 5,463,681 | 10/1995 | Vaios et al. | 379/189 |
| 5,465,293 | 11/1995 | Chiller et al. | 379/189 |
| 5,495,521 | 2/1996 | Rangachar | 379/95 |
| 5,524,145 | 6/1996 | Parker | 379/197 |
| 5,566,234 | 10/1996 | Reed et al. | 379/188 |
| 5,596,632 | 1/1997 | Curtis et al. | 379/189 |
| 5,602,906 | 2/1997 | Phelps | 379/114 |
| 5,615,251 | 3/1997 | Hogan et al. | 379/112 |
| 5,627,886 | 5/1997 | Bowman | 379/189 |
| 5,627,887 | 5/1997 | Freedman | 379/144 |
| 5,706,338 | 1/1998 | Relyea et al. | 379/189 |
| 5,719,927 | 2/1998 | Hariu et al. | 379/114 |
| 5,754,632 | 5/1998 | Smith | 379/114 |
| 5,768,354 | 6/1998 | Lange et al. | 379/114 |
| 5,787,150 | 7/1998 | Reiman et al. | 379/114 |
| 5,790,645 | 8/1998 | Fawcett et al. | 379/114 |
| 5,805,686 | 9/1998 | Moller et al. | 379/114 |

FOREIGN PATENT DOCUMENTS

| | | | |
|---|---|---|---|
| 0 618 713 A2 | 10/1994 | European Pat. Off. | H04M 3/22 |
| 0 653 868 A2 | 5/1995 | European Pat. Off. | H04M 3/42 |
| WO 96/08907 | 3/1996 | WIPO . | |

*Primary Examiner*—Curtis A. Kuntz
*Assistant Examiner*—Rexford N Barnie

[57] ABSTRACT

A method and system for detecting and preventing the fraudulent use of phone services in which the recipient of a telephone call is responsible for charges only after they agree to accept the telephone call is disclosed herein. The system and method includes a mechanism for detecting the initiation of a telephone call, wherein associated with the telephone call is a telephone number. The present invention searches a database for a prior occurrence of the telephone number. If the telephone number is found in the database, the information in the database associated with the telephone number is analyzed to determine if the telephone call is fraudulent. The system and method compares the information in the old record with a threshold to determine if the telephone call is fraudulent. The system and method completes the telephone call if the step of comparing determines the telephone call is not fraudulent in response to the step of comparing. The present invention updates the old record with the information for the telephone call if the step of searching finds an old record of a prior occurrence of the telephone number and the telephone call is rejected by the telephone call recipient. The present invention creates a record of the telephone call if the telephone number is not found in the database, and the telephone call is rejected by the recipient.

59 Claims, 1 Drawing Sheet

MECHANISM FOR A SYSTEM AND METHOD FOR DETECTING FRAUDULENT USE OF COLLECT CALLS

BACKGROUND OF THE INVENTION

1. Field of the Invention

The present invention relates to a method and system for preventing the fraudulent use of telephone services. In particular, the present invention is concerned with the class of services in which the recipients of the telephone calls, or called party, are responsible for the charges only after they agree to accept the calls from the calling party. These services are more commonly known as "collect calls."

2. Related Art

Collect calls are almost always more expensive than direct dial calls because of the additional service the telephone company provides. In a collect call, the calling party initiates the call to the party being called, and the called party agrees to accept the charges for the call before the connection is made between the calling and called parties. The calling party is sometimes allowed to record a brief message (e.g., their name) to identify themselves to the called party. The brief message is then played back to the called party, allowing them to determine whether to accept the collect call or not.

Unfortunately, this message is often fraudulently used to let the called party know that they should initiate a call to the calling party, thus avoiding the extra charges to the called party. In operation, the called party does not accept the charges for the collect call and subsequently initiates a direct call to the calling party at a reduced direct dial rate. Sometimes the purpose of initiating a collect call is only to provide a signal to the calling party (e.g., "I have arrived at my destination"). Understandably, as the difference between the cost of a collect call and a direct dial call increases, fraudulent collect calls become more likely.

Often fraudulent collect calls result in a complete loss of revenue to the phone company providing the collect call service. The loss can be compounded if the called party subscribes to a long distance service carrier different from the phone company providing the collect call service. After a fraudulent collect call, therefore, the company providing the collect call service does not receive any of the long distance charges for the subsequent direct dial long distance call. This scenario is especially frequent when the fraudulent collect call involves international traffic.

What is needed is a method and system that will detect and prevent fraudulent collect calls. This capability allows a collect call service provider to proactively address the problems of fraudulent calls by discouraging or removing the incentive to initiate fraudulent calls, thereby greatly decreasing or eliminating the cost of fraudulent calls.

SUMMARY OF THE INVENTION

The present invention is a method and system for detecting and preventing the fraudulent use of phone services in which the recipient of a telephone call is responsible for charges only after they agree to accept the telephone call. The system and method includes a mechanism for detecting the initiation of a telephone call, wherein associated with the telephone call is a telephone number. The present invention searches a database for a prior occurrence of the telephone number. If the telephone number is found in the database, the information in the database associated with the telephone number is analyzed to determine if the telephone call is fraudulent. The system and method compares the information in the old record with a threshold to determine if the telephone call is fraudulent. The system and method completes the telephone call if the step of comparing determines the telephone call is not fraudulent in response to the step of comparing. The present invention updates the old record with the information for the telephone call if the step of searching finds an old record of a prior occurrence of the telephone number and the telephone call is rejected by the telephone call recipient. The present invention creates a record of the telephone call if the telephone number is not found in the database, and the telephone call is rejected by the recipient.

BRIEF DESCRIPTION OF THE FIGURES

In the drawings, like reference numbers indicate identical or functionally similar elements. Additionally, the left-most digit of a reference number identifies the drawing in which the reference number first appears. The present invention will be described with reference to the accompanying drawings, wherein.

DETAILED DESCRIPTION OF THE PREFERRED EMBODIMENTS

Figure 1:
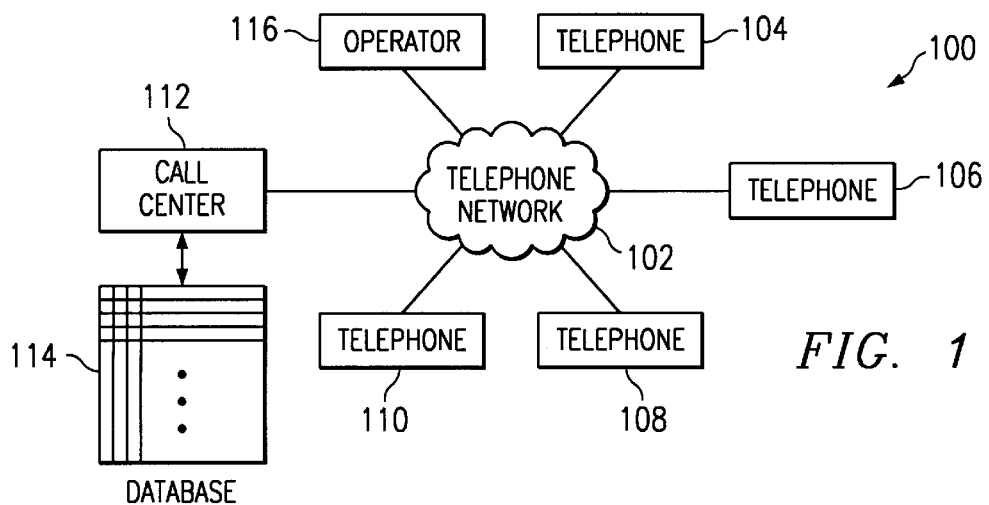
FIG. 1 illustrates an exemplary telephone system.

FIG. 1 illustrates a telephone system 100, which is an exemplary environment of the present invention. Telephone system 100 includes a telephone switching network 102, telephones 104, 106, 108 and 110, call center 112, and database 114, and operator 116.

Telephone switching network 102 is operative to connect the terminating elements of the telephone system 100 in response to the initiation of a telephone call. Examples of terminating elements are telephones 104–110 and other terminating devices such as faxes, modems, voice mail services, etc. In the present invention, there are two primary telephone numbers associated with a telephone call. The first primary telephone number is the number assigned to the telephone system terminating element from which the call is originated, referred to as the calling number. The second primary telephone number is the number to which the call is directed, referred to as the called number. The called and calling numbers are also referred to as the Dialed Number Identification System (DNIS) and the Automatic Number Identification (ANI), respectively.

A collect call is initiated at a telephone system terminating element such as one of telephones 104–110. Usually, the calling party is allowed to record a brief message to identify themselves to the called party. The brief message is then played back for to the calling party, allowing them to determine whether to accept the collect call or not. This message is often fraudulently used to let the called party know that they should initiate a call to the calling party. The called number is provided to the switching network 102 by the terminating element initiating the call. The telephone switching network 102 then makes the connection between the terminating elements assigned to the called and calling numbers.

The call center 112 acts as a clearinghouse for all collect calls initiated on the telephone system 100. When a collect call is initiated at a telephone 104–110, telephone switching network 102 determines that a collect call has been initiated and routes the collect call through call center 112. Call center 112 provides the mechanism for handling collect calls. After the collect call has been routed to the call center 112 by telephone switching network 102, call center 112 determines whether the collect call initiated at one of the telephones 104–110, is a possible fraudulent call and either terminates or completes the collect call. Call center 112 determines whether the collect call is fraudulent by analyzing the information in database 114 that is associated with the called or calling number for the instant collect call.

Database 114 stores records of collect calls that have been rejected by the called party. Each record of a rejected collect call in database 114 is associated with a called or calling telephone number. Each record contains either the called number, calling number, or a combination or portion of both called and calling numbers of a rejected collect call. The records may also contain information such as the number of rejected collect calls, the date and time for each rejected collect call, an analysis of the voice or alphanumeric message for the rejected collect call, or any other information that may aid in determining the possibility of a fraudulent collect call attempt. In an alternative embodiment, database 114 may contain individual records for a called or calling number, so that a combination of called and calling number records may be used in determining the existence of a fraudulent collect call. Each record in the alternative embodiment would represent a particular instance of a collect call attempt.

When a collect call is received, call center 112 determines whether the collect call is possibly fraudulent by searching database 114. Depending on the specific implementation, call center 112 may search database 114 for the called or calling numbers, a combination of the called and calling numbers or a combination of parts of the called and calling numbers. In an alternative embodiment, call center 112 searches a first database for the called number, and a second database for the calling number. If the call center 112 finds the particular number, or combination of numbers, it analyzes the information the database record(s) to determine if the current collect call is fraudulent. If the analysis of database 114 information indicates that the instant collect call is fraudulent, call center 112 either cancels the collect call, or forwards the collect call to operator 116 for further analysis.

An exemplary collect call between telephones 104 and 110 is herein explained with reference to FIG. 1. A collect call is initiated from telephone 104 which is assigned a calling telephone number. The collect call is detected by telephone switching network 102. Telephone switching network 102 then routes the collect call to call center 112. Call center 112 checks the collect call information against information stored in database 114. Call center 112 then determines whether or not the initiated collect call is fraudulent. If the initiated collect call is determined to be fraudulent, then call center 112 either cancels the collect call or routes the collect call to operator 116 for further analysis. If, on the other hand, call center 112 determines that the collect call is not fraudulent, call center 112 then routes the collect call back to the telephone switching network to telephone 110 for completion. If, after completion, the collect call attempt is rejected by the called party, the call center 112 updates the information for the collect call in database 114.

Figure 2:
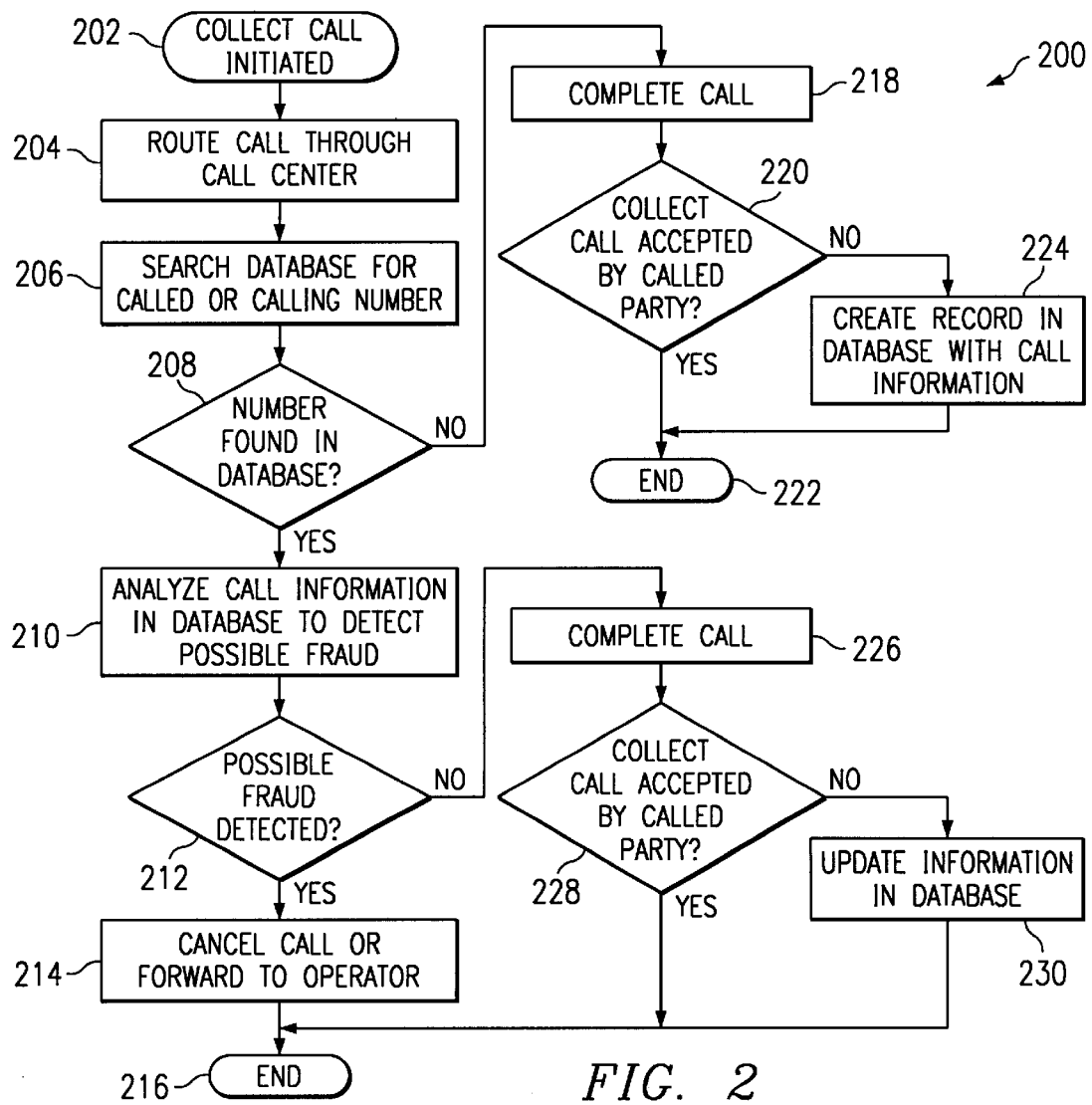
FIG. 2 illustrates a flow chart of the method of the present invention.

FIG. 2 illustrates the process for detection of fraudulent collect calls 200. A collect call is initiated by the calling party at step 202. For the purposes of the present invention, a collect call is any call in which the called party is responsible for the charges only after they agree to accept the charges for the call from the calling party. Telephone switching network 102 detects the initiation of a collect call and routes the collect call to call center 112 at step 204. Step 204 routes the initiated collect call to the call center 112 so that the collect call information may be analyzed to determine if the collect call is fraudulent. At step 206, database 114 is searched by call center 112 for an occurrence of either the called or calling number for the collect call. At step 208, if the call center 112 determines that the called or calling number exists in database 114, the process proceeds to step 210.

After call center 112 determines that the called or calling number exists in database 114 at step 208, the information in the database record containing the called or calling number in database 114 is analyzed at step 210. Step 210 analyzes and compares the called information in database 114 with thresholds to determine if the current collect call is fraudulent.

The present invention may use various methods of data analysis to determine the probability of a fraudulent collect call. In a preferred embodiment, the called number is stored in database 114. A total number of rejected collect calls and dates associated with each rejected collect call is stored in the record associated with the called number. If the number of rejected collect calls to the called number exceed a predetermined threshold within a predetermined time period, a fraudulent collect call is detected. In a second embodiment, records are created for both the called and calling numbers after the occurrence of a rejected collect call. Analysis is performed based on the combination of the called and calling numbers after the initiation of a collect call. Because of the increase in analysis accuracy, the threshold for the number of rejected collect calls can be much lower.

Step 212 determines if fraud was detected at the analysis step 210. If fraud was detected at step 210, the process continues to step 214. Step 214 either cancels the fraudulent collect call or forwards the fraudulent collect call to operator 116 for further analysis. Whether the fraudulent collect call is canceled or forwarded to operator 116 will be implementation specific, or dependent upon the level of analysis performed at step 210. After the fraudulent collect call has been canceled or forwarded to operator 116, the process ends at step 216.

If, at step 208, the called or calling numbers are not found by call center 112 in database 114, the collect call is completed at step 218. Completion of the call at step 218 is a step of completing the call from the calling telephone system terminating element to the called telephone system terminating element. After the collect call has been completed at step 218, step 220 determines whether the collect call was accepted by the calling party. If the collect call was accepted by the calling party at step 220, the process ends at step 222. If, on the other hand, the collect call was not accepted by the calling party at step 220, then a record is created in database 114 with the collect call information at step 224. After a record has been created in database 114 at step 224, the process ends at step 222.

If fraud was not detected at step 212, after the step of analyzing the call information in database 114 at step 210, the process continues at step 226. Step 226 completes the collect call if fraud has not been detected. Step 228 determines whether the collect call was accepted by the called party, after the call has been completed at step 226. If the collect call was accepted by the calling party at step 228, then the process ends at step 216. If, on the other hand, the collect call was not accepted by the calling party at step 228, then the information in the database 114 is updated at step 230.

The particular method of updating the database record is implementation specific. The data that may be added to the database record at step 230 includes the called and calling telephone numbers, a combination or portion of the called and calling numbers, the time and date of the rejected collect call, a copy of the brief message in the collect call, etc. If the database records contain the times and dates of previous rejected collect calls, the time and date information would allow the data of old rejected collect calls to be discarded. This particular embodiment would present a "sliding window" of prior rejected collect calls that would be considered for fraud detection. The sliding window would only allow prior rejected collect calls that occurred within a predetermined date range to be considered when the database record information is analyzed in step 210. After the information has been updated in database 114 at step 230, the process ends at step 216.

Call center 112 searches the database 114 for an occurrence of the called or calling number at step 206. Whether the database has been searched for the called or calling telephone number depends on the implementation of the present invention. If the called number has been the target of repeated rejected collect telephone call attempts, the system may determine that all collect call attempts to that particular number are fraudulent. The number of rejected collect telephone calls to that particular number within a predetermined time period would be counted and compared with a threshold. Alternatively, the number of collect calls originating from a calling number that have been rejected may trigger the fraud detection device. A combination of the number of rejected calls that both the called and calling numbers may be used to determine the existence of a fraudulent call. Additionally, the total number of collect calls may be compared with the number of rejected collect calls. This way the ratio of rejected to accepted collect call attempts to either the called or from the calling number may be used to detect fraudulent collect calls. This may be done so that called numbers with high numbers of collect calls do not trigger fraud detection because of an insignificant number of rejected collect call attempts.

In addition to the called or calling numbers, other information in the collect call message may be used to detect fraudulent collect calls. The call information in the database may also include a voice or alphanumeric analysis of the information in the collect call message. If the called or calling numbers are found in the database, then the voice or alphanumeric analysis of the collect call message could be compared to prior analysis of the voice or alphanumeric information from previous rejected collect calls. This would allow a higher rate of detection of fraudulent collect calls by identifying the voice or other information transmitted in the collect call message.

While the invention has been particularly shown and described with reference to preferred embodiments thereof, it will be understood by those skilled in the relevant art that various changes in form and details may be made therein without departing from the spirit and scope of the invention.

What is claimed is:

1. A method for detecting and preventing the fraudulent use of phone services in which a recipient of a telephone call is responsible for charges only after the recipient agrees to accept the charges for the telephone call, commonly known as a collect call, the method comprising the steps of:

detecting an initiation of a collect call, wherein associated with said collect call is a telephone number;

searching a database of prior collect call information for an old record of a prior occurrence of said telephone number and, if said old record exists, comparing, before completion of said collect call, said prior collect call information in said old record with a predetermined threshold to determine if said collect call is fraudulent;

creating a new record of an occurrence of said telephone number in said database if the recipient does not accept the charges for said collect call and said step of searching does not find a record of a prior occurrence of said telephone number; and completing said collect call to the recipient if said old record does not exist or said step of comparing determines said collect call is not fraudulent.

2. The method of claim 1, wherein said telephone number is the telephone number of the initiator of said collect call.

3. The method of claim 1, wherein said telephone number is the telephone number of the recipient of said collect call.

4. The method of claim 1, further comprising the step of updating said prior collect call information for said collect call in said old record, if said step of searching finds an old record of said prior occurrence of said telephone number, and said step of comparing does not determine the collect call to be fraudulent, and the charges for said collect call are not accepted by the recipient.

5. A telephone system, comprising:

a telephone switching network for connecting two or more terminating elements in response to a telephone call, wherein a collect call is a telephone call where a recipient of said telephone call agrees to accept the charges associated with said telephone call;

a database that includes a plurality of records that each store information regarding one or more collect calls, wherein at least one record is created within said database when a given collect call is rejected by said recipient subsequent to said telephone switching network connecting said two or more terminating elements in response to said given collect call; and a call center, coupled to said telephone switching network and said database, that determines whether a collect call is fraudulent, wherein all collect calls are first switched via said telephone switching network to said call center prior to connecting said two or more terminating elements.

6. The telephone system of claim 5, wherein said collect call can be initiated between said two or more terminating elements by dialing a telephone number and recording a brief message.

7. The telephone system of claim 5, wherein said call center determines whether said collect call is fraudulent by comparing the total number of collect calls to a called number with the total number of rejected collect calls by said called number.

8. The telephone system of claim 5, wherein said plurality of records include a record for each called number and a record for each calling number.

9. The telephone system of claim 8, wherein each of said plurality of records includes the number of rejected collect calls associated with said called number and the date and time of each of said rejected collect calls.

10. The telephone system of claim 9, wherein each said record includes a voice message.

11. The telephone system of claim 5, wherein said plurality of records contain a record for at least one of a called number, a calling number, or a combination or portion of both said called number and said calling numbers of a rejected collect call.

12. The telephone system of claim 5, wherein if said call center determines that said collect call is fraudulent, said collect call is canceled.

13. The telephone system of claim 5, wherein if said call center determines that said collect call is fraudulent, said collect call is transferred to an operator.

14. The telephone system of claim 13, wherein said call center routes said collect call back to said telephone switching network for completion of said collect call if said call center determines that said collect call is not fraudulent.

15. The telephone system of claim 14, wherein said call center updates said database if said collect call is rejected by said recipient.

16. The telephone system of claim 5, wherein said call center updates said database if said collect call is rejected by said recipient.

17. The telephone system of claim 5, wherein said call center routes said collect call back to said telephone switching network for completion of said collect call if said call center determines that said collect call is not fraudulent.

18. The telephone system of claim 5, wherein said call center compares said information stored in at least one of said plurality of records to a threshold to determine whether said collect call is fraudulent.

19. The telephone system of claim 5, wherein said call center compares said information stored in at least two of said plurality of records to a threshold to determine whether said collect call is fraudulent.

20. The telephone system of claim 5, wherein said call center determines that said collect call is fraudulent when the number of rejected collect calls to a called number within a predetermined time period exceeds a threshold.

21. The telephone system of claim 5, wherein said call center determines that said collect call is fraudulent when the number of rejected collect calls associated with a called number and a calling number exceeds a threshold.

22. The telephone system of claim 5, wherein said call center creates at least one record within said database when said collect call is rejected by said recipient of said telephone call.

23. The telephone system of claim 22, wherein said at least one record is identified by a telephone number of said recipient of said telephone call.

24. The telephone system of claim 5, wherein said database only stores records within a predetermined date range.

25. The telephone system of claim 5, wherein said call center is configured to reject collect calls to a selected set of telephone numbers.

26. The telephone system of claim 5, wherein said call center rejects collect calls originating from a selected set of telephone numbers.

27. The method of claim 1, further comprising canceling said collect call to the recipient if said prior collect call information in said old record exceeds said predetermined threshold.

28. The method of claim 1, further comprising the step of creating at least one record within said database when said collect call is rejected by the recipient upon completion of said collect call.

29. The method of claim 1, further comprising updating said database if said collect call is rejected by the recipient upon completion of said collect call.

30. The method of claim 1, further comprising canceling said collect call to the recipient if said prior collect call information in said old record exceeds said predetermined threshold.

31. The method of claim 1, wherein said step of detecting is performed by a telephone switching network, wherein said telephone switching network routes said collect call to a call center.

32. The method of claim 1, further comprising deleting information from said database prior to a predetermined date.

33. The method of claim 1, further comprising the steps of searching said database of prior collect information for a second old record of a prior occurrence of a calling number and canceling said collect call to the recipient if said prior collect information in said old record and said prior collect information in said second old record exceeds a threshold.

34. The method of claim 1, further comprising the step of rejecting collect calls to a selected set of telephone numbers.

35. The method of claim 1, further comprising the step of transferring said collect call to an operator if said prior collect call information in said old record exceeds said predetermined threshold.

36. A system for detecting and preventing the fraudulent use of phone services in which a recipient of a telephone call is responsible for charges only after the recipient agrees to accept the charges for the telephone call, commonly known as a collect call, the method comprising the steps of:
    means for detecting an initiation of a collect call, wherein associated with said collect call is a telephone number;
    means for searching a database of prior collect call information for an old record of a prior occurrence of said telephone number and, if said old record exists, comparing said prior collect call information in said old record with a predetermined threshold to determine if said collect call is fraudulent;
    means for completing said collect call to the recipient if said old record does not exist or said step of comparing determines said collect call is not fraudulent;
    means for canceling said collect call to the recipient if said prior collect call information in said old record exceeds said predetermined threshold; and
    means for creating at least one record within said database when said collect call is rejected by the recipient upon completion of said collect call.

37. A method for detecting and preventing the fraudulent use of phone services in which a recipient of a telephone call is responsible for charges only after the recipient agrees to accept the charges for the telephone call, commonly known as a collect call, the method comprising the steps of:
    detecting an initiation of a collect call, wherein associated with said collect call is a telephone number;
    searching a database of prior collect call information for an old record of a prior occurrence of said telephone number and, if said old record exists, comparing, before completion of said collect call, said prior collect call information in said old record with a predetermined threshold to determine if said collect call is fraudulent;
    updating said prior collect call information for said collect call in said old record, if said step of searching finds an old record of said prior occurrence of said telephone number, and said step of comparing does not determine the collect call to be fraudulent, and the charges for said collect call are not accepted by the recipient; and
    completing said collect call to the recipient if said old record does not exist or said step of comparing determines said collect call is not fraudulent.

38. The method of claim 37, further comprising canceling said collect call to the recipient if said prior collect call information in said old record exceeds said predetermined threshold.

39. The method of claim 38, further comprising the step of creating a new record of an occurrence of said telephone number in said database if the recipient does not accept the charges for said collect call and said step of searching does not find a record of a prior occurrence of said telephone number.

40. The method of claim 37, further comprising the steps of searching said database of prior collect information for a second old record of a prior occurrence of a calling number and canceling said collect call to the recipient if said prior collect information in said old record and said prior collect information in said second old record exceeds a threshold.

41. The method of claim 37, wherein said telephone number is the telephone number of the recipient of said collect call.

42. The method of claim 37, wherein said step of detecting is performed by a telephone switching network, wherein said telephone switching network routes said collect call to a call center.

43. The method of claim 37, further comprising deleting information from said database prior to a predetermined date.

44. The method of claim 37, further comprising the step of rejecting collect calls to a selected set of telephone numbers.

45. The method of claim 37, further comprising the step of transferring said collect call to an operator if said prior collect call information in said old record exceeds said predetermined threshold.

46. A method for detecting and preventing the fraudulent use of phone services in which a recipient of a telephone call is responsible for charges only after the recipient agrees to accept the charges for the telephone call, commonly known as a collect call, the method comprising the steps of:

detecting an initiation of a collect call, wherein associated with said collect call is a telephone number;

searching a database of prior collect call information for an old record of a prior occurrence of said telephone number and, if said old record exists, comparing, before completion of said collect call, said prior collect call information in said old record with a predetermined threshold to determine if said collect call is fraudulent;

completing said collect call to the recipient if said old record does not exist or said step of comparing determines said collect call is not fraudulent; and creating at least one record within said database when said collect call is rejected by the recipient upon completion of said collect call.

47. The method of claim 46, further comprising canceling said collect call to the recipient if said prior collect call information in said old record exceeds said predetermined threshold.

48. The method of claim 46, further comprising updating said database if said collect call is rejected by the recipient upon completion of said collect call.

49. The method of claim 46, further comprising the steps of searching said database of prior collect information for a second old record of a prior occurrence of a calling number and canceling said collect call to the recipient if said prior collect information in said old record and said prior collect information in said second old record exceeds a threshold.

50. The method of claim 46, wherein said telephone number is the telephone number of the recipient of said collect call.

51. The method of claim 46, wherein said step of detecting is performed by a telephone switching network, wherein said telephone switching network routes said collect call to a call center.

52. The method of claim 46, further comprising deleting information from said database prior to a predetermined date.

53. The method of claim 46, further comprising the step of rejecting collect calls to a selected set of telephone numbers.

54. The method of claim 46, further comprising the step of transferring said collect call to an operator if said prior collect call information in said old record exceeds said predetermined threshold.

55. A method for detecting and preventing the fraudulent use of phone services in which a recipient of a telephone call is responsible for charges only after the recipient agrees to accept the charges for the telephone call, commonly known as a collect call, the method comprising the steps of:

detecting an initiation of a collect call, wherein associated with said collect call is a telephone number;

searching a database of prior collect call information for an old record of a prior occurrence of said telephone number and, if said old record exists, comparing, before completion of said collect call, said prior collect call information in said old record with a predetermined threshold to determine if said collect call is fraudulent; and searching said database of prior collect information for a second old record of a prior occurrence of a calling number and canceling said collect call to the recipient if said prior collect information in said old record and said prior collect information in said second old record exceeds a threshold.

56. The system of claim 36, wherein said telephone number is the telephone number of the recipient of said collect call.

57. The system of claim 36, further comprising means for deleting information from said database prior to a predetermined date.

58. The system of claim 36, further comprising means for rejecting collect calls to a selected set of telephone numbers.

59. The system of claim 36, wherein said means for canceling includes means for transferring said collect call to an operator if said prior collect call information in said old record exceeds said predetermined threshold.

* * * * *